(12) United States Patent
Lee et al.

(10) Patent No.: US 12,556,492 B2
(45) Date of Patent: Feb. 17, 2026

(54) NETWORK MONITORING SYSTEM

(71) Applicant: RESEARCH & BUSINESS FOUNDATION SUNGKYUNKWAN UNIVERSITY, Suwon-si (KR)

(72) Inventors: Young Seok Lee, Suwon-si (KR); Woo Kyung Kim, Suwon-si (KR); Sung Hyun Choi, Suwon-si (KR); Ik Jun Yeom, Suwon-si (KR); Hong Uk Woo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 216 days.

(21) Appl. No.: 17/986,735

(22) Filed: Nov. 14, 2022

(65) Prior Publication Data

US 2023/0155960 A1    May 18, 2023

(30) Foreign Application Priority Data

Nov. 12, 2021    (KR) .......................... 10-2021-0155549

(51) Int. Cl.
  *H04L 47/80*    (2022.01)
  *H04L 47/83*    (2022.01)
(52) U.S. Cl.
  CPC ............ *H04L 47/805* (2013.01); *H04L 47/83* (2022.05)
(58) Field of Classification Search
  CPC ... H04L 47/805; H04L 47/83; H04L 41/0894; H04L 41/5067; H04L 41/0896; H04L 41/16; H04L 67/12; G06N 3/088
  USPC ......................................................... 709/238
  See application file for complete search history.

(56) References Cited

U.S. PATENT DOCUMENTS

| | | | |
|---|---|---|---|
| 11,080,602 B1* | 8/2021 | Oroojlooyjadid ...... G06N 3/045 |
| 2015/0282180 A1* | 10/2015 | Owen ............... H04W 72/0453 370/329 |
| 2020/0167611 A1 | 5/2020 | Yoon et al. |
| 2021/0314238 A1* | 10/2021 | Cioffi .................. H04L 41/5067 |
| 2023/0177349 A1* | 6/2023 | Balakrishnan .......... H04L 67/10 706/25 |

FOREIGN PATENT DOCUMENTS

| | | |
|---|---|---|
| JP | 6790258 B2 | 12/2020 |
| KR | 10-2019-0114672 A | 10/2019 |
| KR | 10-2055141 B1 | 12/2019 |
| KR | 10-2020-0062887 A | 6/2020 |
| KR | 10-2021-0056163 A | 5/2021 |

OTHER PUBLICATIONS

Remo Balaguer, Flow Embedding Algorithms for Software Defined Audio Networks, Sep. 15, 2015, https://pub.tik.ee.ethz.ch/students/2014-HS/MA-2014-14.pdf (Year: 2015).*

* cited by examiner

*Primary Examiner* — Zi Ye
(74) *Attorney, Agent, or Firm* — NSIP Law

(57) ABSTRACT

The present disclosure provides a network monitoring system including a plurality of sensor devices which transmits data packets and a monitoring server which performs the transferable reinforcement learning on the data packets to establish a bandwidth allocation policy in which a quality of experience (QoE) satisfies a set reference QoE to allocate the bandwidth to the plurality of sensor devices.

8 Claims, 7 Drawing Sheets

NETWORK MONITORING SYSTEM

CROSS-REFERENCE TO RELATED APPLICATIONS

This application claims the priority of Korean Patent Application No. 10-2021-0155549 filed on Nov. 12, 2021, in the Korean Intellectual Property Office, the disclosure of which is incorporated herein by reference.

BACKGROUND

Field

The present disclosure relates to a network monitoring system, and more particularly, to a network monitoring system which responsively establishes a bandwidth allocation policy in various network environments by performing transferable reinforcement learning for a smooth operation of a quality-of-experience centered IoT application.

Description of the Related Art

Generally, a quality of experience (QoE) of an IoT application (a virtual physics application), such as localized heavy rain forecast using a temperature profile map, and a navigation based on a vehicle traffic map, is determined by aggregation of distributed information which is continuously updated from sensor devices.

Even though time validity of transmitted information is regarded as important to maintain a quality of the QoE for the IoT application, the validity of all information is not guaranteed at all times due to a limited resource of the device or a limited resource of the network.

That is, the limited bandwidth of the network is shared by a plurality of devices so that the information having an important influence on the QoE is transmitted slowly.

With regard to a bandwidth allocation policy of the network, according to the heuristics method, a specific network environment is assumed and an environment-dependent policy is established by means of mathematical induction so that when the environment is changed, it is necessary to establish the policy by means of the re-induction.

Recently, even though reinforcement learning methods to establish the allocation policy through learning without using complex induction have been proposed, an environment-dependent policy is established for the learning due to the characteristic of the reinforcement learning which requires a lot of samples so that there is a problem in that the policy cannot cope with the changes in the environment.

SUMMARY

An object of the present disclosure is to provide a network monitoring system which responsively establishes a bandwidth allocation policy in various network environments by performing transferable reinforcement learning for a smooth operation of a quality-of-experience (QoE) centered IoT application.

The object of the present disclosure is not limited to the above-mentioned objects and other objects and advantages of the present disclosure which have not been mentioned above can be understood by the following description and become more apparent from exemplary embodiments of the present disclosure. Further, it is understood that the objects and advantages of the present disclosure may be embodied by the means and a combination thereof in the claims.

According to an aspect of the present disclosure, a network monitoring system may include: a plurality of sensor devices which transmits data packets; and a monitoring server which performs the transferable reinforcement learning on the data packets to establish a bandwidth allocation policy in which a quality of experience (QoE) satisfies a set reference QoE to allocate the bandwidth to the plurality of sensor devices.

The monitoring server may include: a storage unit which stores the data packets and the bandwidth allocated to the plurality of sensor devices; and a learning unit which calculates the QoE quality by applying the data packets stored in the monitoring server to the bandwidth allocation policy generated with the transferable reinforcement learning and allocates the bandwidth which satisfies the reference QoE quality.

The learning unit may include: a flow embedding module which applies a flow state of the data packets to an attention mechanism configured by multi-perceptron to output a vector value which accelerates the training speed; and a bandwidth allocation module which forms a latent action which reduces an action search space to accelerate the training speed based on the vector value and a final action which expresses the latent action with a bandwidth allocation value.

The flow embedding module may include a vectorization function which generates an intermediate embedding vector value by applying the flow state to a multilayer perceptron and a relation extraction function which generates the vector value which is a flow embedding weighted by applying the intermediate embedding vector value to the attention mechanism.

The bandwidth allocation module may include an allocation function which forms the latent action according to a position point with respect to the plurality of sensor devices, an adaptation function which derives a control value to allow the latent action to be adapted to the plurality of target network environments, and a sharing function which forms the final action with the latent action and the control value.

The bandwidth allocation module establishes the bandwidth allocation policy in which the QoE quality satisfies the reference QoE quality according to the final action to allocate the bandwidth to the plurality of sensor devices with a data allocation value which represents the final action.

According to the present disclosure, the network monitoring system applies a policy established through a virtual environment to an actual environment network, so that it is advantageous in that a performance of the quality of experience (QoE) centered IoT application may be maximized.

Further, according to the present disclosure, the network monitoring system allows the bandwidth allocation policy established for a specific network environment by means of the reinforcement learning in a virtual environment to be adapted to a new network environment, thereby ensuring the compatibility of the bandwidth allocation policy.

The effects of the present disclosure are not limited to the aforementioned effects, and various other effects may be included within a range which is obvious to those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
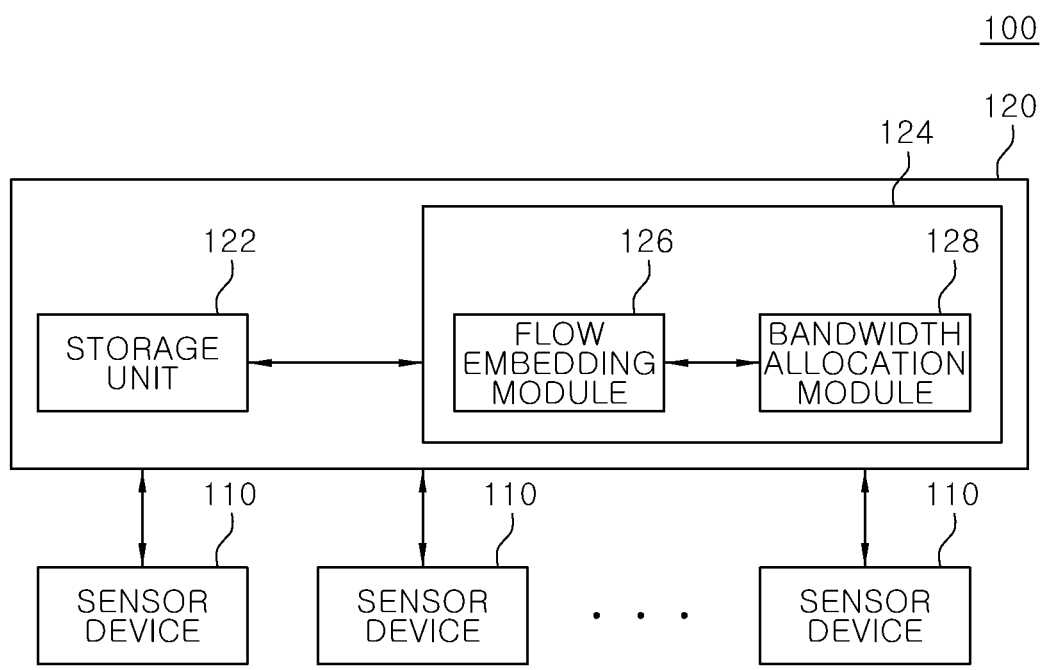
FIG. 1 is a schematic view illustrating a network monitoring system according to the present disclosure.

Those skilled in the art may make various modifications to the present disclosure and the present disclosure may have various embodiments thereof, and thus specific embodiments will be described in detail with reference to the drawings. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present disclosure, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present disclosure. A singular form may include a plural form if there is no clearly opposite meaning in the context. In the present application, it should be understood that the term "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

In the specification and the claim, unless explicitly described to the contrary, the word "comprise" and variations such as "comprises" or "comprising", will be understood to imply the inclusion of stated elements but not the exclusion of any other elements.

Hereinafter, exemplary embodiments according to the present disclosure will be described in detail with reference to accompanying drawings.

Figure 2:
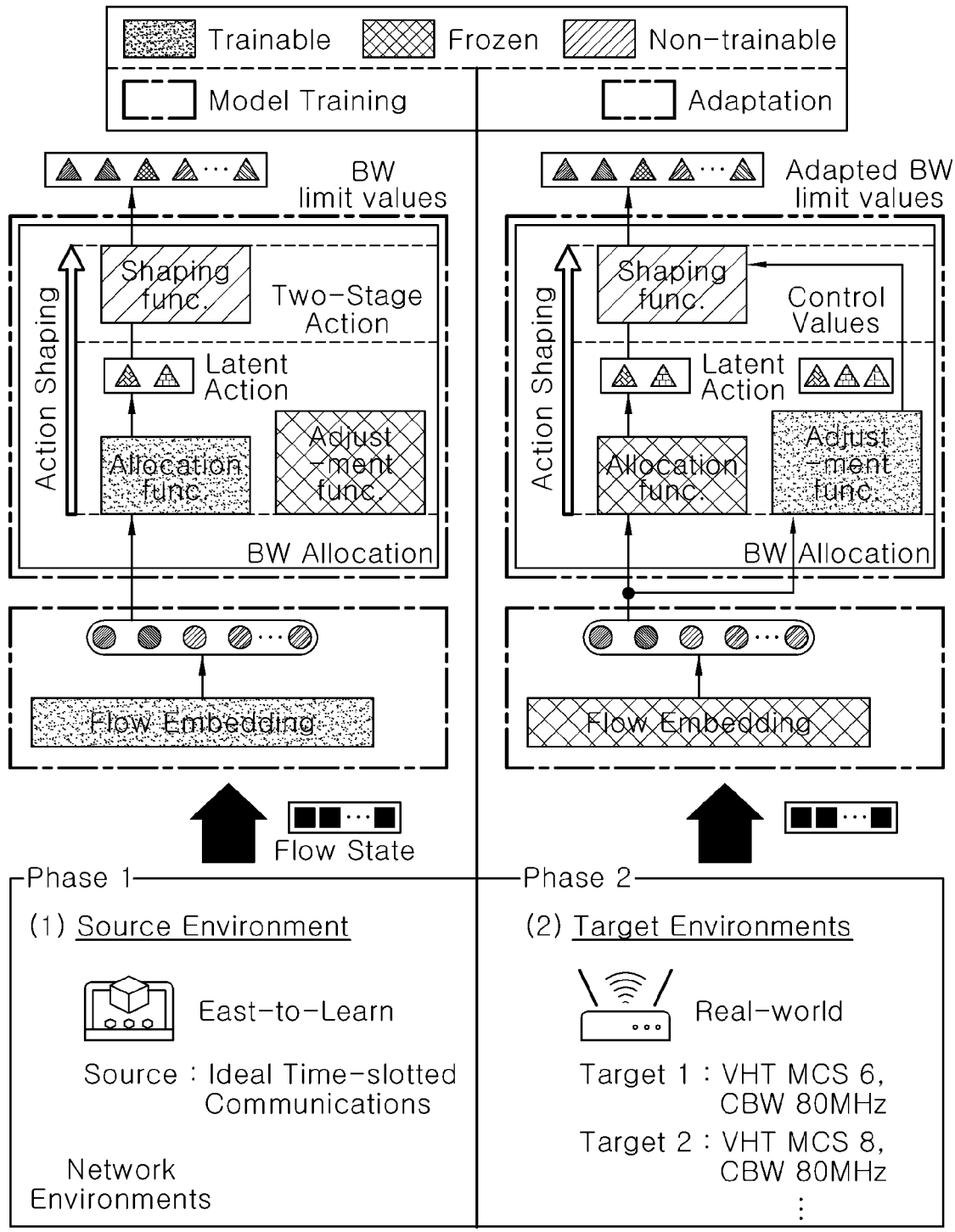
FIG. 2 is a view illustrating a transferable reinforcement learning structure which is applied to a network monitoring system according to the present disclosure.
Figure 3:
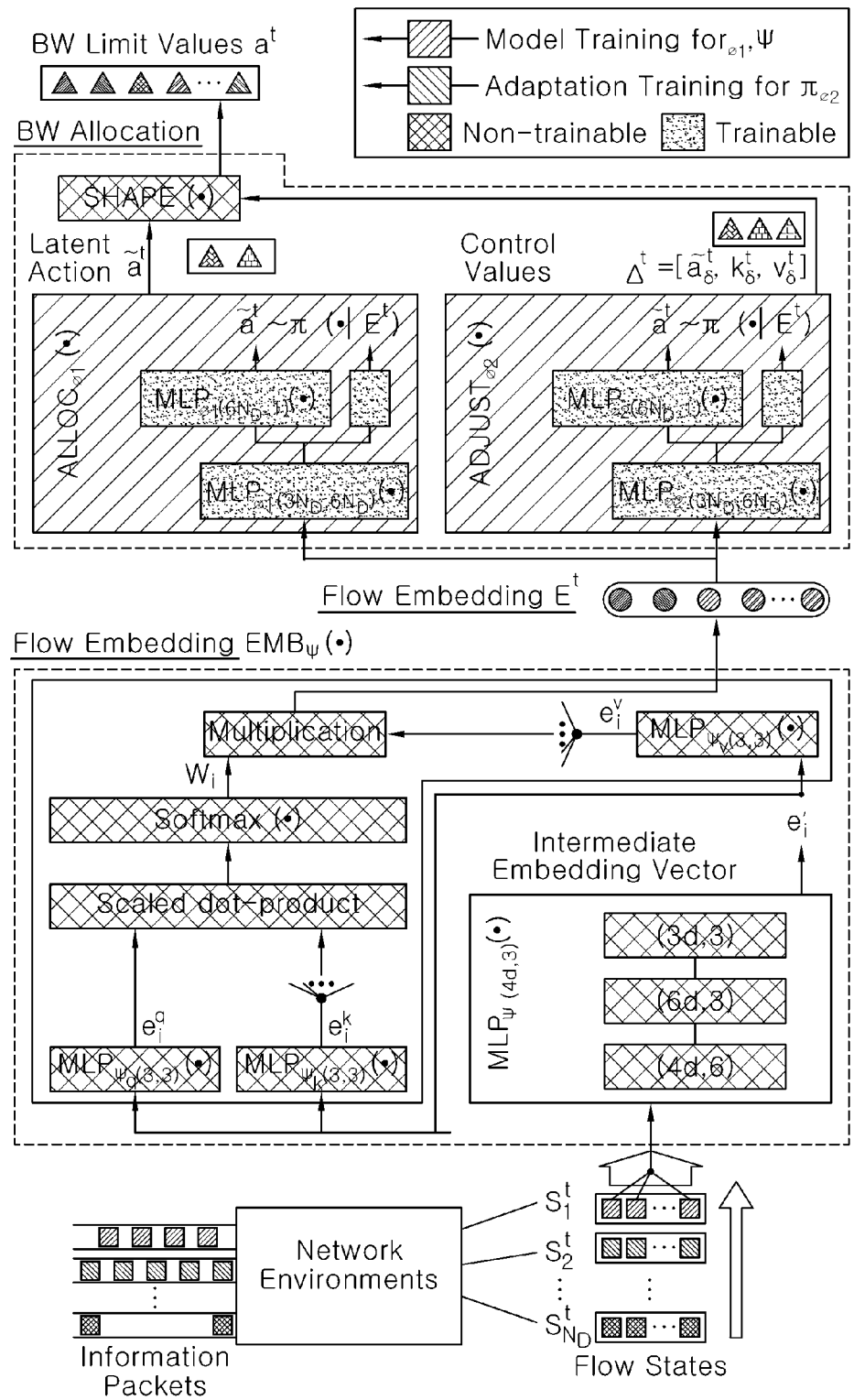
FIG. 3 is a view specifically illustrating a transferable reinforcement learning structure illustrated in FIG. 2.

FIG. 1 is a schematic view illustrating a network monitoring system according to the present disclosure, FIG. 2 is a view illustrating a transferable reinforcement learning structure which is applied to a network monitoring system according to the present disclosure, and FIG. 3 is a view specifically illustrating a transferable reinforcement learning structure illustrated in FIG. 2.

Referring to FIGS. 1 to 3, a network monitoring system 100 includes a plurality of sensor devices 110 and a monitoring server 120.

Each of the plurality of sensor devices 110 transmits data packets according to the bandwidth in which information collected from the sensing area is allocated.

In the exemplary embodiment, the plurality of sensor devices 110 communicates with an external device, such as a navigation and a mobile terminal, and receive information transmitted from the external device to transmit the information to the monitoring server 120.

The monitoring server 120 performs the transferable reinforcement learning on the data packets to establish a bandwidth allocation policy in which a quality of experience (QoE) satisfies a set reference QoE to allocate the bandwidth to the plurality of sensor devices.

The monitoring server 120 may include a storage unit 122 and a learning unit 124.

First, the storage unit 122 stores the data packets and a bandwidth allocated to the plurality of sensor devices 110, but is not limited thereto.

The learning unit 124 calculates the QoE quality by applying the data packets stored in the storage unit 122 to the bandwidth allocation policy generated by the transferable reinforcement learning, and allocates the bandwidth which satisfies the reference QoE quality.

Here, the learning unit 124 may include a flow embedding module 126 and a bandwidth allocation module 128.

The flow embedding module 126 applies a flow state of the data packets to an attention mechanism configured by multi-perceptron to output a vector value which accelerates the training speed.

The flow embedding module 126 may include a vectorization function which generates an intermediate embedding vector value by applying the flow state to a multilayer perceptron and a relation extraction function which generates the vector value which is a flow embedding weighted by applying the intermediate embedding vector value to the attention mechanism.

Prior to describing the flow embedding module 126, in a circumstance with a limited network resource, the QoE quality $\Sigma_{i=1}^{N_D} \alpha_i = A \leq L_e$ is maximized by bandwidth allocation $$\sum_{i=1}^{N_D} d_i^t,$$

which will be represented as follows.

$$\underset{a_1^t,\ldots,a_{N_D}^t}{\text{maximize}} QoE = \sum_{t=0}^{T-1} \int_t^{t+1} QUAL(I^\tau; a_1^t, \ldots, a_{N_D}^t) d\tau,$$

$$\text{subject to } \sum_{i=1}^{N_D} a_i^t = A \leq L_\varepsilon$$

Here, $QUAL(I^\tau; \alpha_1^t, \ldots, \alpha_{N_D}^t)$ is a function of evaluating a QoE quality, $L_\tau$ is a link allocation amount according to the network environment $\varepsilon$, T is a total allocation time, $N_D$ is the number of sensor devices, $I^\tau=(I_1^\tau, \ldots, I_{N_D}^\tau)$ is a sum of information transmitted from the plurality of sensor devices 11.

Here, referring to FIGS. 2 and 3, the vectorization function included in the flow embedding module 126 generates an intermediate embedding vector value $e'_i=MLP_\psi(S_i^t)$ by applying the flow states $S_i^t$ to the multilayer perceptron MLP function $MLP_\psi(\cdot)$ at every time step t.

The relation extraction function included in the flow embedding module 126 generates the flow embedding $E^t$ using the intermediate embedding vector $E'=[e'_1, \ldots, e'_{N_D}]$ and the attention function $ATT\psi(\cdot)$.

In the relation extraction function, query, key, and value vectors $(q_i, k_i, v_i)$ may be calculated from the multilayer perceptron MLP functions $(MLP_{\psi q}(\cdot), MLP_{\psi k}(\cdot), MLP_{\psi v}(\cdot))$.

$$x_i = MLP_{\psi x}(e'_i), x \in \{q,k,v\}$$

Next, the attention weight $W_i$ which measures the importance with the flow state $S_i^t$ and the other flow states may be calculated.

$$w_i = \text{Softmax}\left(\left[\frac{q_i^T \cdot k_1}{\sqrt{d}}, \ldots, \frac{q_i^T \cdot k_{N_D}}{\sqrt{d}}\right]\right) = [Pr(w'_1), \ldots, Pr(w'_{N_D})]^T = [w_1, \ldots, w_{N_D}]^T$$

Here, it is defined as $$Pr(w'_i) = \frac{\exp(w'_i)}{\sum_{j=1}^{N_D} \exp(w'_j)}.$$

The flow embedding $e_i^t$ may be calculated by $(w_1 v_1 + \ldots + w_{N_D} v_{N_D})$.

That is, the flow embedding process is summarized as follows and is a function $EMB_\psi(\cdot)$ by a trainable parameter $\psi$.

$$E^t = EMB_\psi(S^t) = ATT_\psi([MLP_\psi(S_1^t), \ldots, MLP_\psi(S_{N_D}^t)])$$

The bandwidth allocation module 128 includes an allocation function which forms a latent action according to a position point with respect to the plurality of sensor devices 110, an adaptation function which derives a control value to allow the latent action to be adapted to the plurality of target network environments, and a sharing function which forms the final action with the latent action and the control value.

The allocation function expresses the position of the sensor device 110 with a 2D grid and derives the latent action $\tilde{\alpha}^t=[\tilde{\alpha}_1^t, \ldots, \tilde{\alpha}_{N_p}^t]^T$ for the point $[p_1, \ldots, p_{N_p}]$ which are randomly disposed on the grid.

$$\tilde{\alpha}^t = ALLOC_{\phi_1}(E^t)$$

Here, in order to accelerate the training speed, $N_p \ll N_D$ is assumed and $ALLOC_{\phi_1}(\cdot)$ is a function parameterized with $\phi_1$ trained by the RL and forms the policy $\pi_{\phi_1}$.

The adaptation function is a function $ADJUST_{\phi_2}$ parameterized with $\phi_2$ which is trained by the transferable reinforcement learning forms the policy $\phi_2$ and derives a control value $\Delta^t=[\tilde{\alpha}_\delta^t, k_\delta^t, v_\delta^t]$ for adapting to various network environments.

$$\Delta^t = ADJUST_{\phi_2}(E^t)$$

Here, in order to increase the training speed for the domain adaptation, a range of the value of $\tilde{\alpha}_\delta$ is limited to $z\%$ of $\tilde{\alpha}$.

The shape function derives a final action $\alpha^t$ by passing the control value $\Delta^t=[\tilde{\alpha}_\delta^t, k_\delta^t, v_\delta^t]$ and the latent action $\tilde{\alpha}^t=[\tilde{\alpha}_1^t, \ldots, \tilde{\alpha}_{N_p}^t]^T$ through the SHAPE function which is non-trainable.

$$\alpha^t = SHAPE(\tilde{\alpha}^t + \tilde{\alpha}_\delta^t)|_{k+k_\delta^t, \nu+v_\delta^t}$$

Specific calculation of the shape (SHAPE) function is as follows.

$$\tilde{a}'_i = \sum_{j=1}^{N_p} \frac{\tilde{a}_j^t + \tilde{a}_{\delta,j}^t + \epsilon}{\|D_i - p_j\|^{k+k_\delta^t} + \epsilon},$$

$$a'_i = \begin{cases} \tilde{a}'_i, & \text{if } \tilde{a}'_i \geq 0.1 N_p, \\ c, & \text{otherwise}. \end{cases}$$

$$a^t = (1 - \nu - v_\delta^t) A \cdot \text{Softmax}([a'_1, \ldots, a'_{N_D}]) = (1 - \nu - v_\delta^t) A \cdot [Pr(a'_1), \ldots, Pr(a'_{N_D})]^T = [a'_1, \ldots, a'_{N_D}]^T$$

Here, $\|D_i - p_j\|$ is a distance between the sensor device $D_i$ and the point $p_j$, $\epsilon \ll 1$ is very small positive number, and $c=-2$ is a value for clip.

The shape (SHAPE) function is not limited to the above equation and another type of calculating method is also sufficiently used.

Finally obtained bandwidth allocation values (general action) $[\alpha_1^t, \ldots, \alpha_{N_D}^t]T$ of the sensor devices are transmitted to individual devices through one packet, and the device $D_i$ updates the information in the storage unit 122 according to the allocated bandwidth $\alpha_i^t$ through a network.

That is, the bandwidth allocation module 128 establishes the bandwidth allocation policy in which the QoE quality satisfies the reference QoE quality according to the final action to allocate the bandwidth to the plurality of sensor devices with a data allocation value which represents the final action.

As described above, the learning unit 124 establishes the bandwidth allocation policy in various network environments by means of the two-phase learning processes using the flow embedding and action shaping techniques with the transferable reinforcement learning.

The flow embedding expresses the state for the information update flow of the sensor devices as a low dimension vector value which accelerates the training speed, using an attention mechanism configured by a multilayer perceptron.

According to the action shaping, an action of determining an action of the policy is formed in two stages. In the first stage, a latent action which reduces an action search space to accelerate the training speed is derived, and in the second stage, a general action which expresses the latent action with a bandwidth allocation value is formed. Here, the process of forming the latent action as the general action is configured by a function which is not necessary to be trained to be adjusted by a parameter to support the domain adaptation.

In Phase 1, in an easy-to-learn environment (source environment) such as an ideal network, a trainable function is trained for the flow embedding and the action shaping to establish the initial policy.

In phase 2, in order to adapt the initial policy established in the source environment to an environment (target environment) such as a real network environment, only the adaptation function is trained for the action shaping to establish an optimal policy corresponding to the environment.

FIGS. 4 to 7 are exemplary execution diagrams illustrating a performance of a network monitoring system according to the present disclosure.

Figure 4:
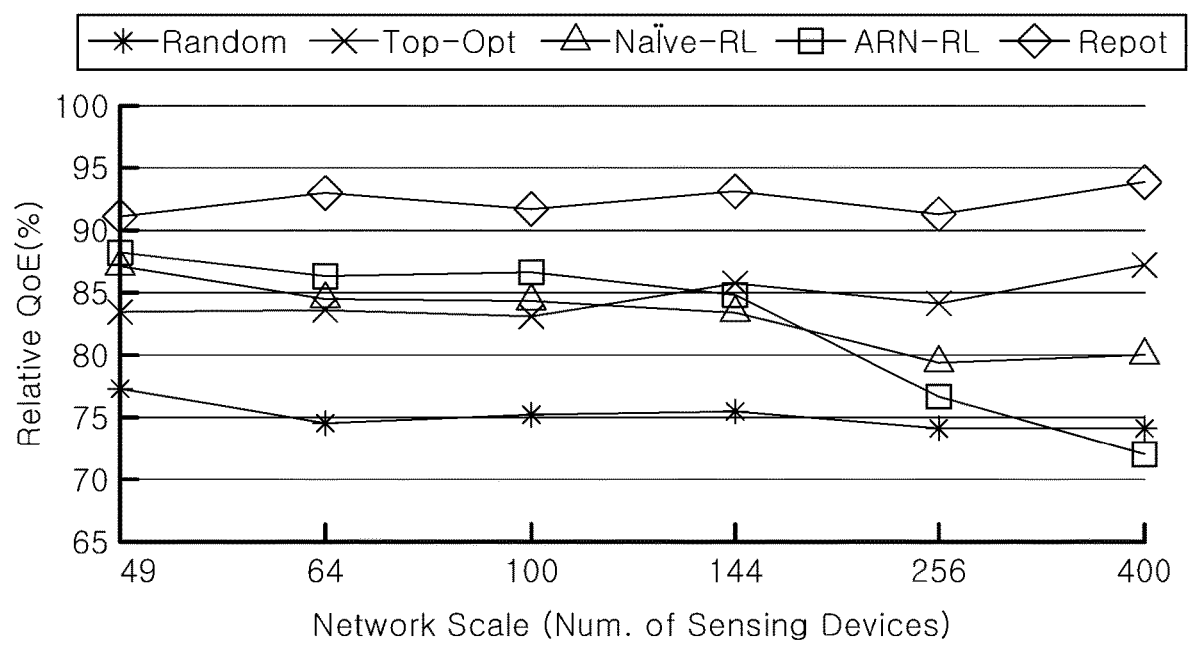
FIGS. 4 to 7 are exemplary execution diagrams illustrating a performance of a network monitoring system according to the present disclosure.

FIG. 4 illustrates a performance of the present disclosure (Repot) according to a network scale and it is understood that 90% or more of QoE performance is maintained regardless of the network scale.

Figure 5:
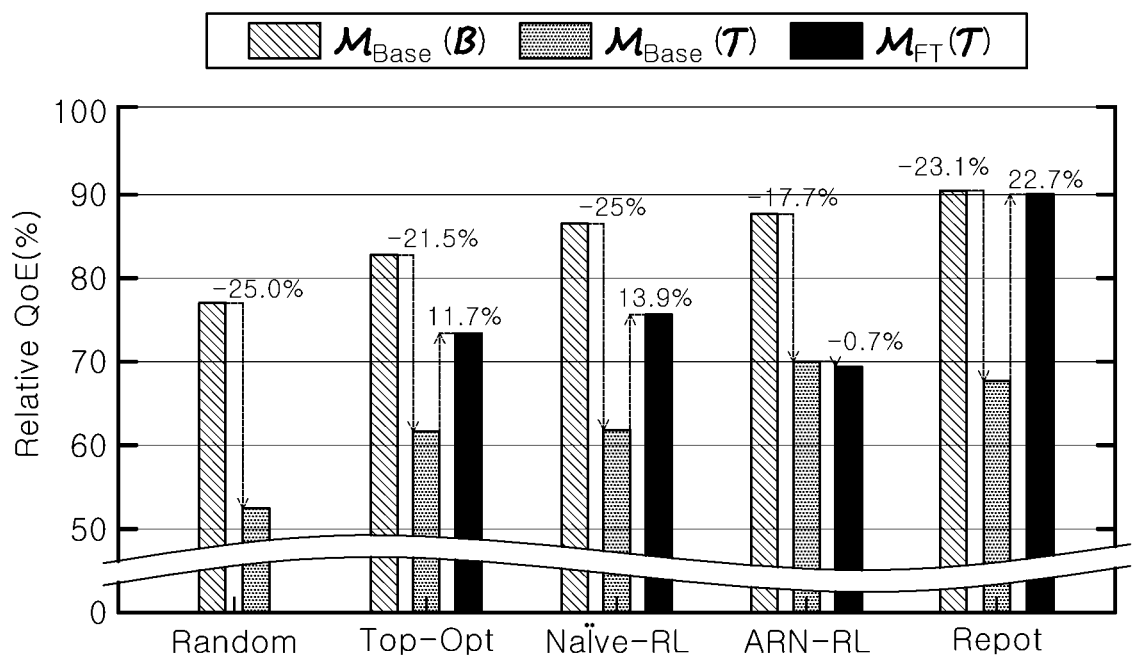

FIG. 5 illustrates a performance when the initially established policy is adapted to a test in another network environment.

During the test, in all the control groups including the present disclosure (Repot), 20% or more of QoE is reduced, but in the present disclosure, it is understood that the performance is recovered to an original performance value through the adaptation performance, that is, the adaptation process of the action shaping.

Figure 6:
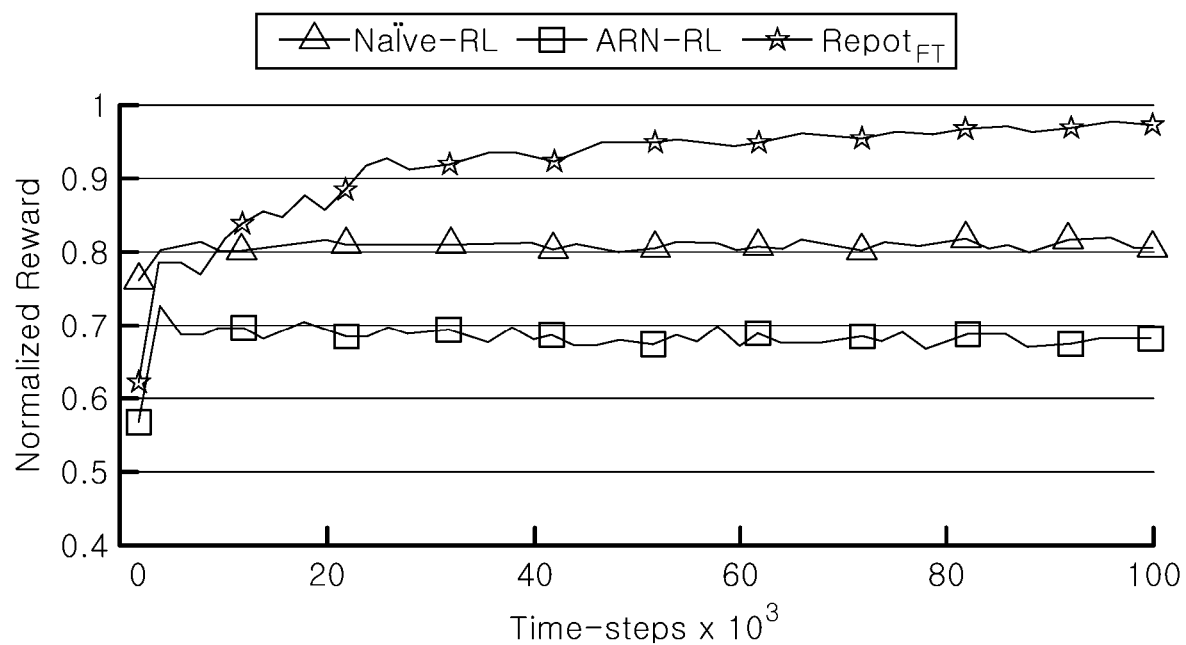

FIG. 6 illustrates a gain of the training speed.

It shows that even though 1.6 million training samples were required for initial policy establishment, when it is adapted to another network environment, the training is possible with 100000 training samples.

Figure 7:
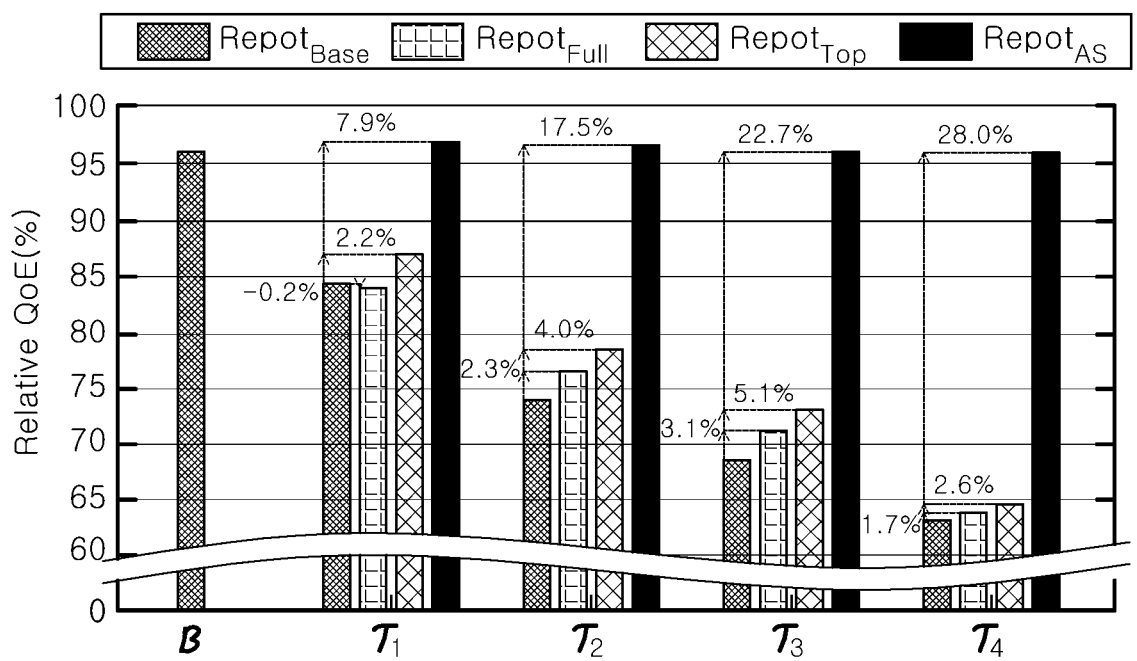

FIG. 6→FIG. 7 illustrates a performance when the initially established policy is adapted in various network environments. It is understood that when the present disclosure is adapted by the action shaping method, 90% or more of QoE is maintained. Even though the present disclosure (Repot) can be adapted to the environment by another method, the QoE is low when the other method (full, top) is used.

The features, structures, effects and the like described in the foregoing embodiments are included in at least one embodiment of the present disclosure and are not necessarily limited to one embodiment. Moreover, the features, structures, effects and the like illustrated in each embodiment may be combined or modified by those skilled in the art for the other embodiments to be carried out. Therefore, the combination and the modification of the present disclosure are interpreted to be included within the scope of the present disclosure.

It will be appreciated that various exemplary embodiments of the present disclosure have been described herein for purposes of illustration, and that various modifications, changes, and substitutions may be made by those skilled in the art without departing from the scope and spirit of the present disclosure. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

What is claimed is:

1. A network monitoring system, comprising:
a plurality of sensor devices configured to transmit data packets; and
a monitoring server comprising at least one processor and configured to perform transferable reinforcement learning on the data packets to establish a bandwidth allocation policy,
wherein the transferable reinforcement learning uses a two-phase learning process to allocate a bandwidth to the plurality of sensor devices so that a quality of experience (QoE) satisfies a set reference QoE,
wherein a first training data size of a first phase of the two-phase learning process is larger than a second training data size of a second phase of the two-phase learning process, and
wherein the two-phase learning processes uses a flow embedding technique and an action shaping technique with the transferable reinforcement learning to establish the bandwidth allocation policy.

2. The network monitoring system according to claim 1, wherein the monitoring server includes:
a storage unit which stores the data packets and the bandwidth allocated to the plurality of sensor devices; and
a learning unit implemented by the at least one processor and configured to compute the QoE quality by applying the data packets stored in the monitoring server to the bandwidth allocation policy generated with the transferable reinforcement learning, and to allocate the bandwidth which satisfies the reference QoE quality.

3. The network monitoring system according to claim 2, wherein the learning unit includes:
a flow embedding module implemented by the at least one processor and configured to apply a flow state of the data packets to an attention mechanism configured by a multilayer perceptron (MLP) to output a vector value which accelerates a training speed; and
a bandwidth allocation module implemented by the at least one processor and configured to form a latent action which reduces an action search space to accelerate the training speed based on the vector value, and to form a final action which expresses the latent action with a bandwidth allocation value.

4. The network monitoring system according to claim 3, wherein the flow embedding module includes a vectorization function which generates an intermediate embedding vector value by applying the flow state to a multilayer perceptron and a relation extraction function which generates the vector value which is a flow embedding weighted by applying the intermediate embedding vector value to an attention mechanism.

5. The network monitoring system according to claim 3, wherein the bandwidth allocation module includes an allocation function which forms the latent action according to a position point with respect to the plurality of sensor devices, an adaptation function which derives a control value to allow the latent action to be adapted to a plurality of target network environments, and a sharing function which forms the final action with the latent action and the control value.

6. The network monitoring system according to claim 5, wherein the bandwidth allocation module establishes the bandwidth allocation policy in which the QoE quality satisfies the reference QoE quality according to the final action to allocate the bandwidth to the plurality of sensor devices with a data allocation value which represents the final action.

7. The network monitoring system of claim 1, wherein the flow embedding technique expresses a flow state of the data packets to an attention mechanism configured by a multilayer perceptron (MLP) to output a vector value which accelerates a training speed.

8. The network monitoring system of claim 7, wherein the action shaping technique forms a latent action which reduces an action search space to accelerate the training speed based on the vector value and a final action which expresses the latent action with a bandwidth allocation value.

* * * * *